W. R. & J. T. PAYNE.
TRACK GAGE.
APPLICATION FILED FEB. 19, 1910. RENEWED SEPT. 24, 1912.
1,059,388.
Patented Apr. 22, 1913.
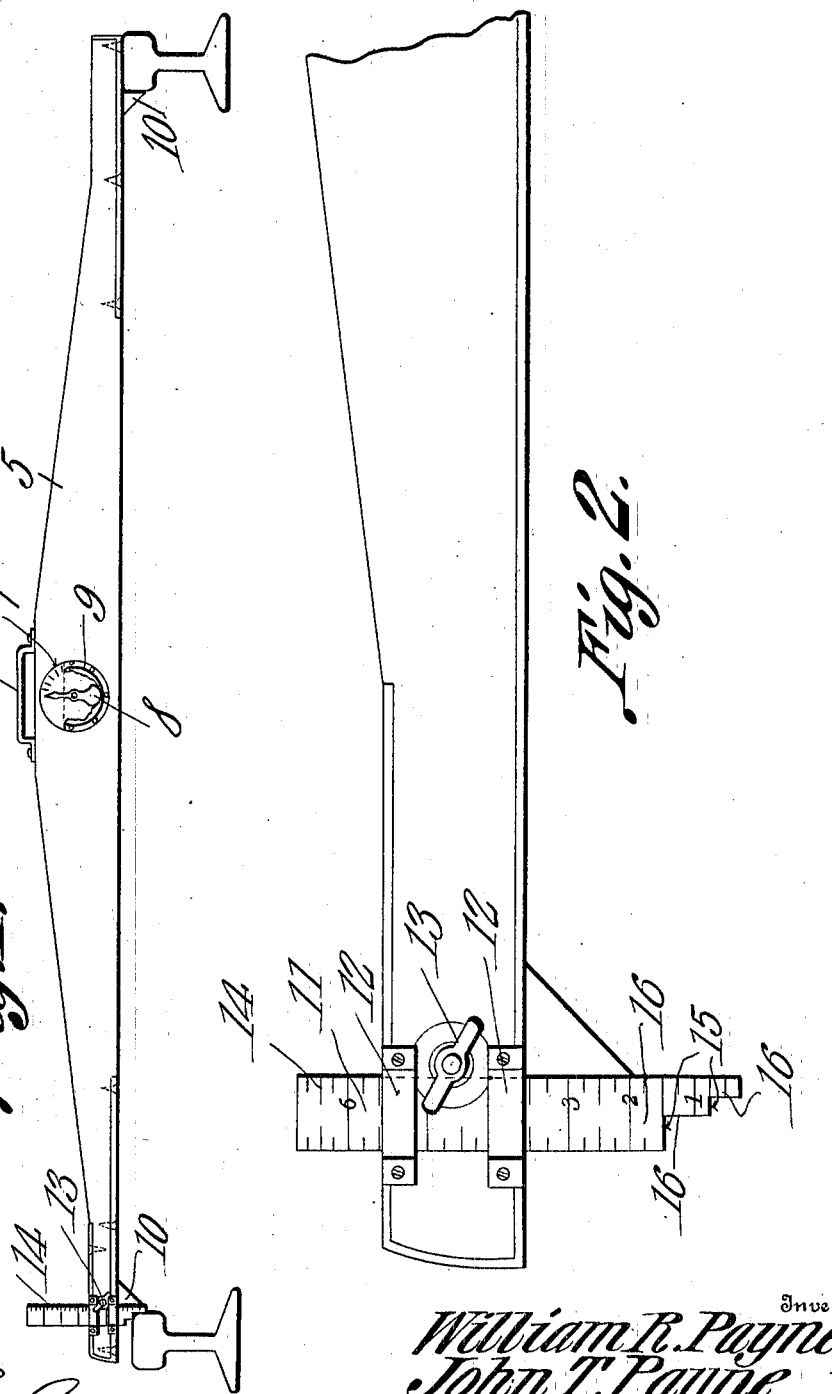

UNITED STATES PATENT OFFICE.

WILLIAM R. PAYNE AND JOHN T. PAYNE, OF SCARBRO, WEST VIRGINIA, ASSIGNORS OF ONE-FOURTH TO JOHN P. BAKER, ONE-HALF TO VERTMONT P. SPRADLIN, AND ONE-FOURTH TO WILLIAM T. DRUMMOND, ALL OF SCARBRO, WEST VIRGINIA.

TRACK-GAGE.

1,059,388.      Specification of Letters Patent.      Patented Apr. 22, 1913.

Application filed February 19, 1910, Serial No. 544,825. Renewed September 24, 1912. Serial No. 722,124.

*To all whom it may concern:*

Be it known that we, WILLIAM R. PAYNE and JOHN T. PAYNE, citizens of the United States, residing at Scarbro, in the county of Fayette, State of West Virginia, have invented a new and useful Track-Gage, of which the following is a specification.

It is the object of the present invention to provide an improved construction of track gage such as employed in adjusting railway tracks to the proper width and level upon both the straight and the curved portions of the track. In such devices, it is customary to provide a gage or indicator, the dial of which is marked off in degrees, the purpose of this gage being to indicate the relative elevation of the rails on curves. The workmen who usually handle such gages find it difficult, however, to readily read such a gage and further find the degree marks thereon to be more or less difficult to employ in calculating said relative elevation. Inasmuch as on curves, the outer rail will have an elevation varying from a fraction of an inch to possibly several inches, the present invention aims to so construct the gage that the reading taken therefrom will be in inches and fractions of inches instead of in degrees. Also, while the rails on a straight stretch of track will be spaced apart four feet, eight and one half inches, on the curves, this distance between the rails will be increased, in some places, as much as an inch. To ascertain whether or not the rails are properly spaced at a curve, the ordinary gages include a member or element adapted to fill in the space which would otherwise occur between one of the rail engaging shoulders and the side of the tread of the rail. In the present invention, however, it is contemplated that means be provided for not only readily determining whether or not the rails have the proper relative elevation, but also whether or not they are correctly spaced and this means is so constructed that no calculation will be required on the part of the user of the gage.

In the accompanying drawings,—Figure 1 is a view in front elevation of the device, and Fig. 2 is a similar view in detail of one end thereof.

In the drawings the device is illustrated as embodying a stock which is indicated by the numeral 5 and is provided at a point between its ends with a handle 6 which may be grasped for the purpose of carrying the gage from place to place and also for supporting the same while in actual use. A recess 7 is formed in the front face of the stock at a point midway between the ends thereof and upon the bottom wall of this recess are painted or otherwise depicted scale marks, and a pointer 8 is mounted within the recess and coöperates with the said scale marks to indicate when the stock is level. A substantially semi-circular plate 9 is secured over the recess and partly closes the same, and this plate serves to protect the weighted end of the pointer and also the pivot for the said pointer.

Upon its under edge, adjacent each end, the stock is provided with a shoulder which is indicated by the numeral 10 and these shoulders are so spaced that when the device is disposed upon the rails of a straight line of track, the said shoulders will abut against the inner or opposed sides of the treads of the rails. In other words, the rail-engaging faces of the shoulders are spaced apart four feet, eight and one half inches, as before stated, and as is well known, the rails of a curved stretch of track are spaced apart a distance greater than four feet, eight and one half inches, and in order that it may be readily determined whether or not they are properly spaced, there is provided, at one end of the stock, a stepped blade. This blade is indicated by the numeral 11 and is mounted for vertical sliding adjustment in suitable guides 12 upon the front face of the said stock.

A set screw 13 is threaded into the stock and the head of the screw is arranged to project over and bear against one edge of the blade and to hold the same at adjustment. It will be observed that the blade is provided upon its front face with scale marks 14 which preferably denote inches and fractions of inches, and it will further be observed that the lower edge of the lower one of the guides 12 is coincident with the lower edge of the stock and serves as an indicator for coöperation with the scale marks on the said blade. It will also be observed that one edge of the blade abuts against the rail-engaging edge of that shoulder 10 which is located at the same end of the stock as is the said blade. The lower portion of the blade is cut-away in a stepped manner so as to afford shoulders 15 designed to engage with the tread of one of the track rails, and also to form rail-engaging heads 16 adjacent to the shoulders and at right angles thereto and arranged to engage with one side of the head of the said rail, as will be presently fully explained.

In using the device, the same is disposed upon the rails with the shoulder at that end of the stock opposite the end at which the blade 11 is located, bearing against one rail, and the shoulder at the other end of the stock bearing against the other rail. If the rails constitute a part of a straight line of track, the shoulders will both abut against the rails and the pointer 8 should indicate the zero mark of the dial in front of which it is mounted. If the device is disposed upon the rails of a curved section of the track, however, the device is similarly disposed upon the rails except that the blade 11 is so adjusted that one or the other of its several rail-engaging heads 16 will bear against the side of the rail head. It is well known that the distance between the rails on a curved section of track increases in ratio to the increase in elevation of the outer rail above the inner rail so that it will as a consequence be readily understood that should the blade be so adjusted that its proper edge 16 will be brought into engagement with the rail, the lower edge of the lower one of the guides 12 should be in registration with that one of scale marks 14 indicating the proper elevation of the rail in consideration of its proper spaced relation with respect to the other rail. In other words, if the rail is properly spaced and elevated, both of these conditions will be indicated by the blade 11 and variations or discrepancies may be readily ascertained and rectified.

What is claimed is:

In a device of the class described, a stock having a fixed rail engaging shoulder near one end, a blade mounted for vertical adjustment near the other end of the stock and having a plurality of relatively vertically offset rail engaging shoulders, the said shoulders being located at that side of the blade opposite the side which is presented toward the fixed shoulder and the said shoulders being successively spaced from the fixed shoulder at greater distances, from the lowermost to the uppermost shoulder, said blade having a scale on one face, indicating means coöperating with the scale upon the blade and level-indicating means upon the stock.

In testimony that we claim the foregoing as our own, we have hereto affixed our signatures in the presence of two witnesses.

WILLIAM R. $\overset{\text{his}}{\times}$ PAYNE.
$\phantom{WILLIAM R. }\overset{\text{mark}}{}$
JOHN T. PAYNE.

Witnesses:
JAMES S. BUCKNER,
WILLIAM L. HANGER.

Witnesses as to mark of William R. Payne:
B. L. BOSTICK,
E. G. HATCHER.

---

Copies of this patent may be obtained for five cents each, by addressing the "Commissioner of Patents. Washington, D. C."